United States Patent [19]

Hungerford

[11] 4,386,407
[45] May 31, 1983

[54] LATHE CONTROL SYSTEM
[75] Inventor: William R. Hungerford, Detroit, Mich.
[73] Assignee: The Bendix Corporation, Southfield, Mich.
[21] Appl. No.: 176,891
[22] Filed: Aug. 11, 1980
[51] Int. Cl.³ .............................................. G05B 13/00
[52] U.S. Cl. .................................... 364/474; 364/177; 318/621
[58] Field of Search ............... 364/474, 475, 161, 170, 364/176, 177; 318/561, 571, 579, 600, 601, 602, 609, 621

[56] References Cited
U.S. PATENT DOCUMENTS

| 3,725,651 | 4/1973 | Cutler | 318/571 |
| 3,906,324 | 9/1975 | Smith | 318/571 |
| 3,962,618 | 6/1976 | Burton et al. | 318/561 |
| 3,976,861 | 8/1976 | Edwards et al. | 318/571 |
| 3,979,653 | 9/1976 | Cutler | 318/621 |
| 4,079,235 | 3/1978 | Froyd et al. | 318/571 |
| 4,094,959 | 6/1978 | Ball et al. | 364/177 |
| 4,096,770 | 6/1978 | Tanner | 364/474 |
| 4,131,837 | 12/1978 | Whetham | 318/571 |

Primary Examiner—Gary Chin
Attorney, Agent, or Firm—Markell Seitzman; Russel C. Wells

[57] ABSTRACT

A numerical control system for a lathe having a cutting tool attached to at least one movable slide. The control system includes velocity or acceleration command generators causing the slide to accelerate to a predetermined velocity prior to the initiation of thread cutting. A digital or analog compensation network causes the slide to follow its associated command signal with zero following error.

5 Claims, 4 Drawing Figures

LATHE CONTROL SYSTEM

BACKGROUND OF THE INVENTION

1. Field of the Invention

This invention relates generally to numerically controlled machine tools having rotating spindles and movable slides and more particularly to the control system and methodology for controlling the movement of these slides to cut normal and tapered threads.

2. Brief Description of the Prior Art and Summary of the Invention

Numerically controlled lathes are often used to manufacture objects having screw threads. It is highly desirable to have incorporated in the numerically controlled lathe the ability to cut a thread when the spindle is moving at a non-constant rotational speed. Traditionally thread cutting systems have utilized a high lag type 1 servo-mechanism. Because of its simplicity, this type of servo-mechanism or controller has been used almost exclusively in numerically controlled equipment. As will be discussed below the type 1 servo-mechanism has various deficiencies which become apparent during certain thread cutting procedures.

Threads are typically cut in an object or workpiece by making repeated passes with a cutting tool. To insure that the machine tool cuts the same thread during these repeated passes, the motion command for the tool is synchronized with the turning motion of the spindle. In prior art systems incorporating the type 1 controller, the machine tool often lags behind the motion command. It can be shown that for a type 1 servomechanism, the lag in any axis is proportional to the feedrate along that axis. An expression for the lag along the ith axis is given below:

$$LAG_i = (1/K_v)k_i N$$

where $k_i$ is a component of the thread pitch, N is the spindle speed, and $K_v$ is the servo velocity constant. As can be seen from the above equation, if the spindle speed varies, the lag changes, the tool position shifts in relation to the workpiece, and the thread is ruined. Well designed machines are capable of holding the spindle speed relatively constant to produce good threads. Even so, it is necessary to allow additional time for the spindle speed to stabilize between speed changes and to provide sufficient time at the start of threading for the machine tool to accelerate to a constant rotational velocity and for the following error to stabilize at a new value.

Quite often the end user of the lathe requires that the threads be rough-cut at high spindle speeds, to minimize the cutting time and then to final-cut, polished or honed at a lower spindle speed. This two-pass thread cutting cannot be performed easily with prior art numerically controlled lathes since the following error is proportional to the rate of spindle rotation. Other applications of numerically controlled lathes require threads to be cut having a non-constant lead. Because the lag is proportional to the thread lead as well as to the spindle speed, the lag will vary during the course of the thread cutting. Thus prior art numerically controlled lathes are not suitable for this type of thread cutting either.

It is, therefore, an object of the present invention to solve the deficiencies noted in the prior art. It is a further object of the invention to be able to accurately control the machine tool permitting repeated cutting of a thread at different or varying spindle speeds. It is further object of the invention to provide a numerical control system for cutting tapered threads. And it is yet another object of this invention to provide a numerical control system that can cut threads with leads that vary linearly with spindle rotation. According to the specific embodiments illustrated in the drawings and discussed in detail below, a numerical control system is used to control the motion of a machine tool, such as a lathe, having a rotating spindle and a cutting tool attached to at least one moveable slide. A controller generates command signals which are synchronized to the rotational motion of the spindle. These command signals may take the form of shaped velocity or acceleration profiles providing a first phase during which one or more slides are accelerated to required velocities and during which time the cutting tool is brought into contact with the rotating workpiece. This procedure is followed by a second phase during which a thread is cut and a final phase during which the slide is decelerated and the cutting tool is retracted from the workpiece.

The machine tool further includes slide means responsive to the input command signals for moving the slides along predetermined coordinate axes. The slide means may comprise motors such as stepping motors for moving the slides and appropriate feedback signal transducers. The control system includes compensation means for causing the slides to follow the command signals in a controlled manner. A feature of the present invention is the incorporation within the control system of a compensation network to force the machine tool to operate as a type 2 servo-mechanism or equivalent thereof permitting the slides to follow the command signals with minimal offset errors during threading. The system may also include means for changing the characteristics of the compensation network after threading to force the appropriate slide to operate as a type 1 servo-mechanism to achieve a rapid retract of the tool from the workpiece.

In one embodiment of the invention an analog compensation network is used, while in another embodiment a digital compensation network is used.

Many other objects, advantages and purposes of the invention will be clear from the following detailed description of the drawings.

DETAILED DESCRIPTION OF THE DRAWINGS

Figure 1:
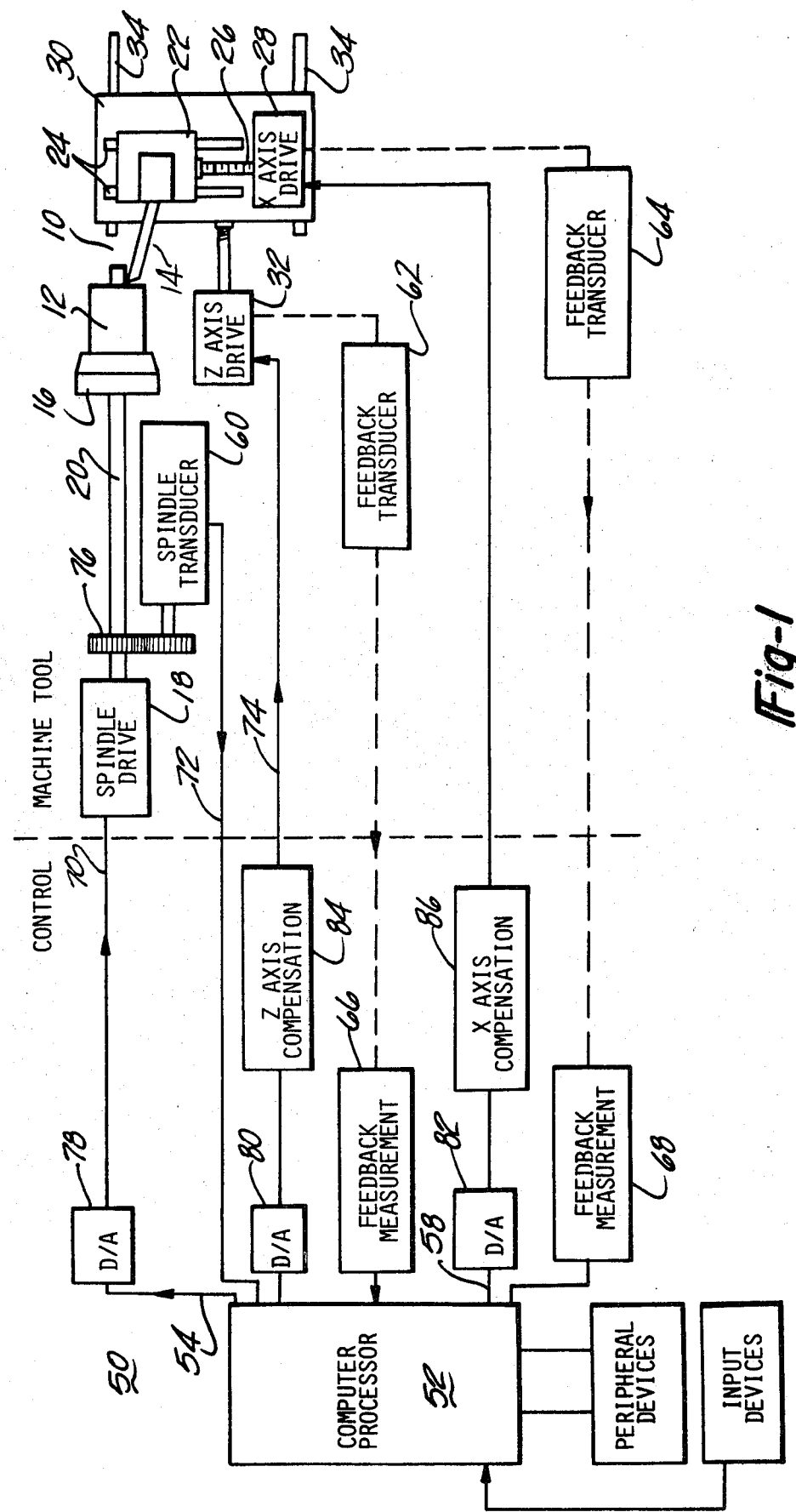
FIG. 1 is a block diagram of a numerical control system for a machine tool incorporating the present invention.

Reference is made to FIG. 1 which illustrates in block diagram form a numerical control system for a lathe 10. The lathe 10 is illustrated as operating upon a cylindrical work piece 12 by means of a cutter 14. The work piece 12 is supported for rotation in a chuck 16 which is rotated by a suitable spindle drive 18 through a shaft 20. The cutter 14 is supported in a holding member or slide 22 which by means of a pair of guide channels 24 permits the slide 22 to move in a direction normal to the axis of rotation of the shaft 20. The slide 22 is moved in a known manner by the interaction of the lead screw 26 which is powered by an X-axis drive 28. The X-axis drive 28, slide 22, the guide channels 24 and lead screw 26 are mounted to a second slide 30. The slide 30 is in turn supported by a second pair of channels 34 which permits motion of the slide 30 in a direction parallel to the spindle or shaft 20 axis. The slide 30 is driven by means of a Z-axis drive 32 and lead screw 26.

The spindle drive 18, the X-axis drive 28 and the Z-axis drive 32 receive command input signals from the numerical control system 50. The numerical control system 50 in the preferred embodiment is a closed loop control system. Data indicating the desired motion of the cutting tool 14 and spindle drive 18 are input into the computer processor 52 from a paper tape, disc, stored program or other media. The computer processor 52 in response to the input data generates a digitial velocity command or acceleration command signals on lines 54, 56 and 58, respectively to command the spindle drive 18, the Z-axis drive 32 and the X-axis drive 28 to move in a predetermined manner. The measurement of feedback parameters such as spindle position and rate, Z and X axis position and rate are obtained through a plurality of feedback transducers 60, 62 and 64 of a known variety. Those skilled in the art will appreciate that each feedback transducer 60, 62 and 64 will each generate an output signal or signals compatible with requirements of the control system. Illustrative of a feedback transducer which may be utilized as the spindle transducer 60 is a rotary pulse transducer driven by a gear set 76. The Z and X-axis transducers 62 and 64 may comprise tachometers or resolvers such as disclosed in U.S. Pat. No. 3,614,575 and U.S. Ser. No. 964,226, respectively each of which are expressly incorporated herein by reference. The output signal of feedback transducers 62 and 64 may be input to a feedback measurement device 66 and 68 which conditions the respective output signals to be compatible with the input requirements of the computer processor 52 and/or generate auxiliary feedback control signals indicative of additional state variables. The respective motors of the spindle drive 18, the X-axis drive 28 and the Z-axis drive 32 receive input commands from the processor 50 via lines 70, 72 and 74 via the digital to analog convertors (D/A) 78, 80 and 82. The output of digital converter 80 is received by the Z-axis compensation network 84 while the output of digital converter 82 is the input to the X-axis compensation network 86. The compensation blocks 84 and 86 as shown in the embodiment of FIG. 1 are analog compensation networks, however, as discussed below the compensation can be implemented within the digital processor 52 or by external discrete digital devices.

Figure 2:
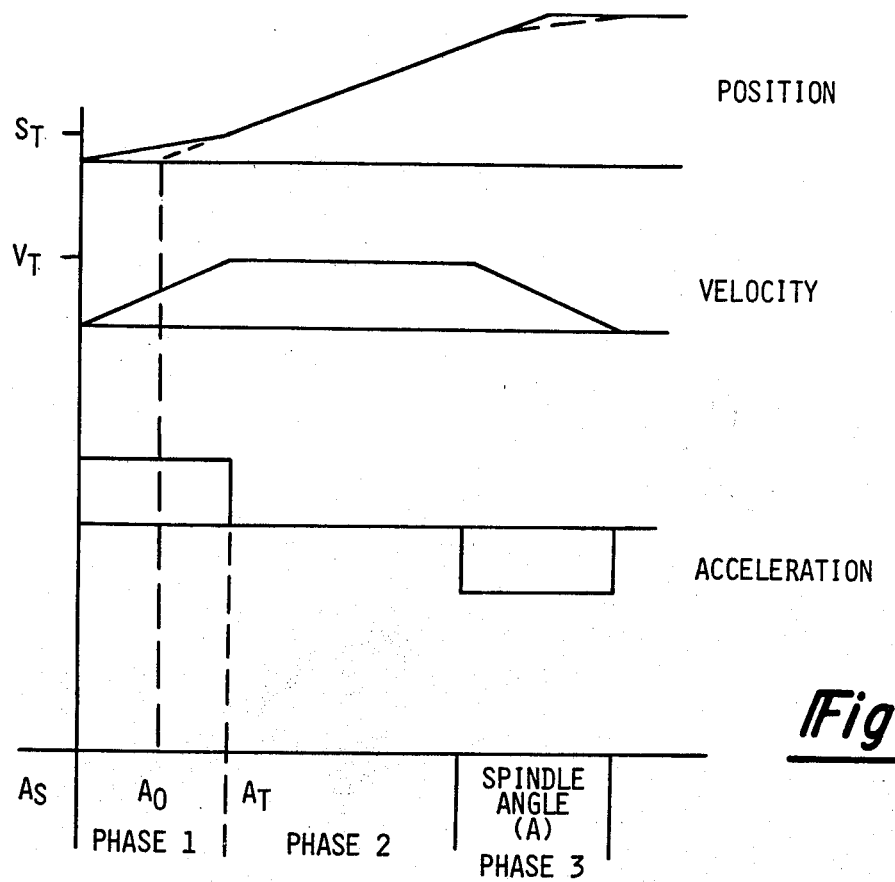
FIG. 2 is a graphic illustration of the command signals which may be input to the machine tool slide.

Reference is now made to FIG. 2. In order to minimize the effects of the transient motion caused by the acceleration and deceleration of the machine tool or components thereof the computer processor 52 generates an acceleration or velocity command signal which will be used to move slides 22 and 30 in a predetermined manner. Good machine tool practice requires that the slides advance in proportion to the rotation of the spindle. Ideally the position of the ith slide can be given by the following equation $$S_i(t) = S_i(O) + K_i(A(t) - A_o)$$

where
- $S_i(t)$ is the position of the ith slide at time (t).
- $K_i$ is the lead for the ith axis.
- $A(t)$ is the spindle angular position at time t and
- $A_o$ is the spindle angular position at the start of the threading process corresponding to the position reference mark on the spindle.

The command signals generated by the computer processor 52 are divided into three phases. The first phase requires the processor to cause the slides to accelerate to velocities proportional to spindle speed. More particularly during phase 1 the appropriate slides are commanded to move at a linearly increasing or ramped velocity or at a constant acceleration. During phase 1 the X-axis drive 28 may move the tool 14 into contact with the workpiece 12. During the second phase the velocities of the slides are maintained at determinable values proportional to the thread lead and the spindle speed during which time a thread is cut. During the third phase the slides are decelerated and the tool 14 may be retracted.

Phase I is intended to minimize the effects of transient motion when the thread is being cut or polished. The present invention requires that the slides accelerate to a threading or target velocity $V_t$ prior to the moment that the spindle has rotated to a reference or target angular position $A_t$. To achieve this threading velocity it is necessary to begin moving the slide at an angle $A_s$ in advance of the threading angle $A_t$. It can be shown that the starting angle $A_s$ is related to $A_o$ and $A_t$ and is given by: $A_s = 2A_o - A_t$. Initiating movment of the slides at an angle $A_s$ in advance of threading causes each slide to reach a position given by $K_i(A_t - A_o)$ at the time the spindle has rotated to the threading angle $A_t$ that corresponds to the beginning or other known point of the thread.

Recalling that it is an object of the present invention to minimize the position lag or offset error during the thread cutting operation. This is accomplished during phase 2 of the thread cutting procedures in conjunction with the command signals and the compensation networks 84 and 86 which have been chosen to control the tool motion as a type 2 servo-mechanism. This type of compensation will tend to force the lag or error toward zero when the spindle is running at a constant or slowly changing speed.

Figure 3A:
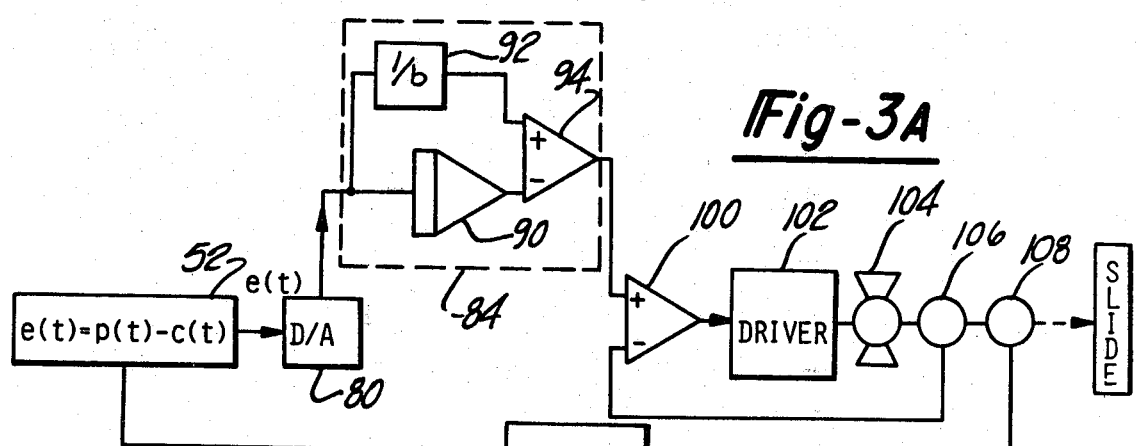
FIG. 3a is a block diagram of one embodiment of a compensation which may be incorporated within the numerical control system of FIG. 1.
Figure 3B:
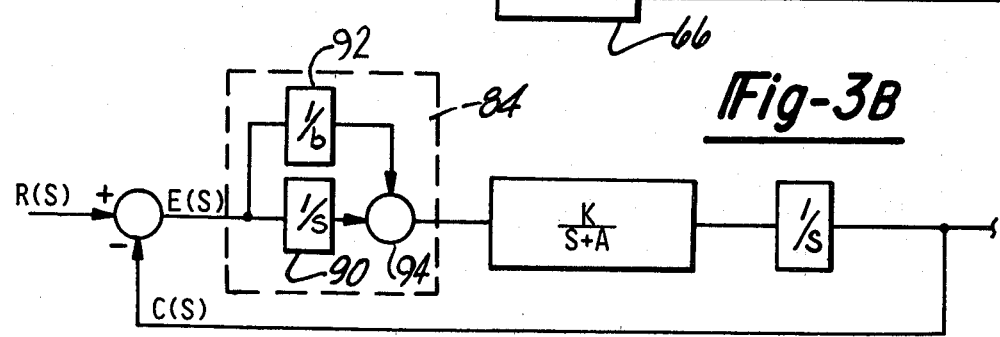
FIG. 3b is a block diagram of another embodiment of the compensation network which may be incorporated within the numerical controller system of FIG. 1.

Reference is made to FIGS. 3A and 3B which respectively illustrate the various parts of the circuit and a block diagram of either the X or Z-axis drive loop. The following discussion is only directed to the Z-axis but is however applicable to the X-axis control. The Z-axis drive loop utilizes the processor 52 to generate an error signal e(t) which may be formed as the difference between the command or reference signal r(t) and a feedback signal c(t). The digitally generated error signal e(t) is the input to the digital to analog (D/A) converter 80, the output of which is connected to the Z-axis compensation network 84 comprising integrator 90, the proportional path 92 and summing amplifier 94. In the embodiment shown in FIG. 3A the compensation network 84 is chosen so that the Z-axis (control system plus machine tool) operates as a type 2 servo-mechanism. The output of the compensation network 84 is the input to the non-inverting input terminal of amplifier 100. The output of amplifier 100 is the input to the amplifier driver 102 which is used to drive motor 104. A tachometer 106 is mounted in a known manner to the shaft of motor 104 and the output of a tachometer 106 is fed back to an inverting terminal of amplifier 100 therein completing the velocity feedback loop. A position feedback device such as a rotary pulse transducer or resolver 108 is similarly mounted to the shaft of motor 104. The output of position feedback device 108 is fed back through appropriate feedback measurement circuitry 66 to the processor 52 therein completing the outer control loop. Reference is made to FIG. 3B which illustrates a simulation diagram corresponding to FIG. 3A. It should be noted that the inner feedback loop comprising amplifier 100, driver 102, motor 104 and tachometer 106 and the integral (l/s) relationship between motor rate as sensed by the tachometer and motor position as sensed by the resolver 108 have been replaced by an equivalent LaPlace transformation. To achieve the type 2 performance of the entire Z-axis it is necessary that the compensation 84 take the form of a proportional plus integral controller having an input to output relationship given in the LaPlace domain as:

$$\frac{(S + b)}{Sb}$$

The closed loop error E(S) can be shown to be:

$$E(S) = S^2 \frac{(S + a) R(s)}{S^3 + aS^2 + kS + kb}$$

For the case in which Phase 2 consists of a constant velocity motion it can be shown that the driving function R(S) is given by $k/S^2$. By using the Final Value Theorem it can be shown that the error signal e(t) approaches 0 as time increases. Consequently there is little following error for ramp type inputs and the threading lag will be minimized during this phase.

Phase 3 is intended to decelerate the slides at the end of the thread cutting operation. Phase 3 may be implemented by detecting the point at which deceleration must start and causing the axes to decelerate as shown in FIG. 2. If an exponential approach to the end point is desired, the compensation networks 84 and 86 may be converted during Phase 3 to a type 1 servo-mechanism. One method of converting the controller of FIG. 3 to a type 1 servo is the selective removal of the integrator 90 from the control loop.

The following discussion describes another embodiment of the invention which utilizes digital control laws to achieve the type 2 and type 1 performance criteria previously described. The discussion further includes the steps needed to generate the command signals. Advantages of digital implementation are the elimination of the plurality of analog components, cost reductions attendant thereto and a sufficient increase in performance and flexibility. By implementing the functions performed by the X-axis and Z-axis compensation networks (84,86) into the processor 52, the processor 52 can, upon command, modify compensation parameters to conveniently change the overall performance characteristics of the machine tool. In addition, the control philosphy presented below is the equivalent to the analog compensation circuits (84,86) and can be implemented within the processor 2 using various digital filter techniques.

The first step in the development of the appropriate command signals is generally known as "preprocessing".

Step 1. Preprocessing

Step 1a. Requires the processor 52 to read the end points, thread depth, screw leads, thread pitch (k) and spindle speed (N) from an input device (see FIG. 1).

Step 1b Requires computation of the time to accelerate and the time to reach the target (beginning or other known point of thread). Based upon the information obtained in step 1a the computer determines the accleration time $T_a$ and the target time $T_t$ as given below.

| | |
|---|---|
| $T_a = k_i \cdot N/k_a;$ | acceleration time |
| $T_t = T_o + T_a;$ | target time | where $k_a$ is a known servo constant

Step 1c. Requires the computation of the distance the control system has to accelerate the Z and X axis slides and the distance to the target position.

| | |
|---|---|
| $S_a = \frac{1}{2}(k_i \cdot N)^2/k_a;$ | acceleration distance |
| $S_t = S_o + S_a;$ | target position |

Step 1d. Requires the computation of the threading velocity.

The threading velocity $V_{ti}$ can be obtained from the knowledge of the spindle speed and pitch of the threads and is given below.

$$V_{ti} = k_i N$$

Step 1e. Requires the computation of the spindle angle to start slide acceleration.

With knowledge of the acceleration time, target time and threading velocity ($k_i \cdot N$) it is possible to determine the starting angle $A_s$ at which time the ramped velocity command or pulse shaped acceleration command (see FIG. 2) must be initiated and the final target angle $A_t$ corresponding to the target position $S_t$.

| | |
|---|---|
| $A_a = N \cdot T_a = k_i \cdot N^2/k_a;$ | acceleration angle |
| $A_s = A_o - (A_a/2);$ | starting angle |
| $A_t = A_o + (A_a/2);$ | target angle |

Step 2. Acceleration Phase

The acceleration phase (phase 1) is defined as illustrated in FIG. 2, is defined by monotonically increasing the velocity of the slides. The command velocity $V_{i+1}$ is given by an initial velocity $V_i$ plus a determinable required velocity change which is given by $\Delta V_i$. The new velocity $V_{i+1}$ and the required velocity change are given below:

| | |
|---|---|
| While $A_s < A < A_t$ | |
| $T_r = T_t - T;$ | time remaining |
| $S_r = S_t - S;$ | distance remaining |
| $A_r = A_t - A;$ | angle remaining |
| $\Delta V_i = 2(S_r/T_r - V_i)l/T_r;$ | required velocity change |
| $V_{i+1} = V_i + \Delta V_i;$ | new velocity |

Step 3. The Following Phase (phase 2).

The operation of the system during threading is characterized by a constant or slowly varying velocity command. It should be appreciated that the command signal given below is substantially equivalent to the previously discussed compensation networks 84 or 86 and will force the tool 14 to follow the command signal with minimal position lag. The velocity command during phase 2 is given by:

$$V_{i+1} = C_i - P_i + \Delta V_i/k_v; \text{ feed foreward-zero lag}$$

where
$k_v$ is the velocity constant of the ith axis.

Step 4. Deceleration (Phase 3)

When the slides reach a position corresponding to the the end of a thread, they must be smoothly decelerated to zero or matched to the slide speeds called for in the next step of the part program otherwise they might overshoot. This may be done by using the acceleration equations to calculate the velocity profile for a smooth stop at the end of the thread.

An alternative to repeating the acceleration calculation at the end of the thread is to switch the sero from zero following error operation to type 1 operation. This is done be detecting the time when the slides reach a point defined as $V_i/K_v$ from the end point. The command is then switched to the end point and the control law is changed to $$V_{i+1} = C_i - P_i.$$

This control law for type 1 operation is characterized by an exponential approach of the slide to the end point.

This invention makes it possible to cut a number of types of threads. When only the spindle Z-axis is programmed to move the machine will cut a straight thread. When both axes are programmed to move the machine will cut a tapered thread. Since the slide speed may change during threading without affecting the thread accuracy, it is possible to cut threads where the lead changes linearly along the length of the thread.

Many changes and modifications in the above described embodiment of the invention can, of course, be carried out without departing from the scope thereof. Accordingly, that scope is intended to be limited only by the scope of the appended claims.

What is claimed is:

1. A control system for a lathe of the type having a spindle adapted to rotate a workpiece about the spindle rotational axis and further having a tool movably situated relative to the workpiece, the system comprising:
    command means including processor means for accelerating the tool to a predetermined target velocity and position and for achieving said target velocity and position when said workpiece has rotated to a target reference angle; for bringing the tool into contact with said rotating workpiece at said target or reference position, for maintaining said tool and contacting engagement with said workpiece at a determinable radius from said spindle axis and for retracting said tool from said workpiece after a determinable interval;
    said command means further synchronized with the rotational motion of said workpiece and responsive to input data and the motion of said spindle for generating a command signal to cause said tool to accelerate to said target velocity at said target position;
    drive means for moving said tool relative to the workpiece;
    compensating means to cause said slide means to follow a compensated command signal with zero following error, wherein said compensating means comprises;
    means for generating a first signal indicative of the position of said workpiece;
    means included in said processor means for generating an error signal comprising the difference between said command signal and said first signal;
    filter means including proportional and integral controller for conditioning said error signal and for generating a second signal indicative of the conditioned error signal;
    feedback transducer means for generating a signal indicative of the speed of the slide;
    drive amplifier means having inverting and non-inverting input terminals adapted to receive at the non-inverting terminal said second signal and to receive at the inverting terminal the signal generated from said feedback transducer means for generating said compensated command signal to control said slide means with zero following error.

2. The system as defined in claim 1 wherein said command signal is a velocity command signal having a first portion that linearly increases with time, a second portion having an initial value corresponding to said target velocity and wherein said value is controlled throughout said determinable interval and a third portion which linearly decreases said velocity command signal with time.

3. The system as defined in claim 2 wherein said target velocity $V_i$ is given by $$V_i = k \cdot N$$

where k is the pitch of the threads to be cut and N is the spindle speed.

4. The system as defined in claim 3 wherein said compensation means begins to accelerate said tool when said workpiece is at a starting angle $A_s$, measured relative to said reference angle $A_o$, wherein said starting angle is given by:

$$A_s = A_o - N \cdot T_a$$

where $T_a$ is defined as the time to accelerate and is given by: $T_a = k_i \cdot N/K_a$ and where $k_i$ is a lead constant and where $k_a$ is the servo velocity constant of servo loop formed by said command means, slide means and said compensation means.

5. The system as defined in claim 3 wherein said compensation means includes means for accelerating said tool when said workpiece is at a starting angle $A_s$, measured relative to a reference angle $A_o$ and target angle $A_t$, wherein $A_s$ is given by:

$$A_s = 2A_o - A_t$$

and means for causing said tool move, during the period of acceleration, a distance given by $ka(A_t - A_o)$ wherein $k_a$ is the servo velocity constant of the servo loop formed by said command means, slide means and said compensation means.

* * * * *